(12) United States Patent
Li et al.

(10) Patent No.: US 10,727,539 B2
(45) Date of Patent: Jul. 28, 2020

(54) ZINC-IODINE SECONDARY ENERGY STORAGE METHODS, DEVICES, AND ELECTROLYTES

(71) Applicant: BATTELLE MEMORIAL INSTITUTE, Richland, WA (US)

(72) Inventors: Bin Li, Richland, WA (US); Huilin Pan, Richland, WA (US); Zimin Nie, Richland, WA (US); Jun Liu, Richland, WA (US); Vincent L. Sprenkle, Richland, WA (US)

( * ) Notice: Subject to any disclaimer, the term of this patent is extended or adjusted under 35 U.S.C. 154(b) by 91 days.

(21) Appl. No.: 15/724,051

(22) Filed: Oct. 3, 2017

(65) Prior Publication Data

US 2018/0342771 A1 Nov. 29, 2018

Related U.S. Application Data (60) Provisional application No. 62/511,580, filed on May 26, 2017.

(51) Int. Cl.
*H01M 10/36* (2010.01)
*H01M 4/62* (2006.01)
(Continued)

(52) U.S. Cl.
CPC .......... *H01M 10/365* (2013.01); *H01M 4/38* (2013.01); *H01M 4/388* (2013.01); *H01M 4/42* (2013.01); *H01M 4/5815* (2013.01); *H01M 4/622* (2013.01); *H01M 4/625* (2013.01); *H01M 4/668* (2013.01); *H01M 10/04* (2013.01); *H01M 10/38* (2013.01); *H01M 2004/027* (2013.01); *H01M 2300/0002* (2013.01)

(58) Field of Classification Search
CPC .............. H01M 10/04; H01M 10/365; H01M 2004/027; H01M 2300/0002; H01M 4/42; H01M 4/625
See application file for complete search history.

(56) References Cited

U.S. PATENT DOCUMENTS 3,738,870 A 6/1973 De Rossi
2016/0285095 A1* 9/2016 Kang .................... H01M 4/133
(Continued)

OTHER PUBLICATIONS

Lee, J., et al., Nanoconfinement of redox reactions enables rapid zinc iodide energy storage with high efficiency, Journals of Materials of Chemistry A, 5, 2017, 12520-12527.
(Continued)

*Primary Examiner* — Adam A Arciero
(74) *Attorney, Agent, or Firm* — Derek H. Maughan (57) ABSTRACT

Disclosed are cathodes having electron-conductive high-surface-area materials, aqueous non-halide-containing electrolytes, secondary zinc-iodine energy storage devices using the same, and methods for assembling the same. The disclosed high-surface-area materials and the aqueous non-halide-containing electrolyte solutions can contribute together to the confinement of the active iodine species in the cathode and to the minimization of shuttle effects and self-discharging. The non-halide-containing electrolyte salts can facilitate preferential adsorption of the iodine species to the cathode material rather than dissolution in the aqueous electrolyte solution, thereby contributing to the confinement of the active iodine species.

16 Claims, 8 Drawing Sheets

(51) Int. Cl.
    *H01M 10/04*     (2006.01)
    *H01M 4/42*     (2006.01)
    *H01M 4/38*     (2006.01)
    *H01M 4/66*     (2006.01)
    *H01M 4/58*     (2010.01)
    *H01M 10/38*     (2006.01)
    *H01M 4/02*     (2006.01)

(56) References Cited

U.S. PATENT DOCUMENTS

2017/0338492 A1* 11/2017 Zimmerman ......... H01M 4/364
2018/0277903 A1* 9/2018 Xu ..................... H01M 4/505

OTHER PUBLICATIONS

Yamamoto, T., et al., Porous and Electrically Conducting Clay-Carbon Composite as Positive Electrodes of Zinc-Oxygen Primary Cells and Zinc-Iodine Secondary Cells, Inorganics Chimica Acta, 142, 1988, 191-193.
Zhao, Q., et al., Rechargeable Lithium-Iodine Batteries with Iodine/Nanoporous Carbon Cathode, Nano Letters, 15, 2015, 5982-5987.

* cited by examiner

| CHEMICALS | STRUCTURES | MOLECULAR WEIGHT (mol/L) | DIPOLE MOMENT (Debye) |
|---|---|---|---|
| $I_2$ | | 254 | 0 |
| $ZnI_2$ | | 319 | 0.0805 |
| $ZnI_6$ | | 827 | 11.4674 |
| $ZnSO_4$ | | 151 | 19.7905 |

FIG. 10

FIG. 11

ZINC-IODINE SECONDARY ENERGY STORAGE METHODS, DEVICES, AND ELECTROLYTES

PRIORITY

This invention claims priority from U.S. Provisional Patent Application No. 62/511,580, entitled "Cathodes, Aqueous Electrolytes, and Secondary Zinc-iodine Energy Storage Devices Using the Same" filed May 26, 2017.

ACKNOWLEDGEMENT OF GOVERNMENT SUPPORT

This invention was made with Government support under Contract DE-AC0576RL01830 awarded by the U.S. Department of Energy. The Government has certain rights in the invention.

FIELD

The present disclosure relates to electrodes, electrode materials, aqueous electrolytes, zinc-iodine energy storage devices using such electrodes and aqueous electrolytes, and methods of assembling the same, particularly to aqueous non-halide-containing electrolytes, high-surface-area cathode materials to which iodine is preferentially adsorbed, and aqueous zinc-iodine energy storage devices using the same.

BACKGROUND

Several key challenges have limited zinc-iodine secondary energy storage devices from achieving the cost and performance levels predicted or expected for such devices. These can include, but are not limited to, an absence of low-cost, suitable cathode materials with high capacity and long-term cycle stability; shuttle effects and self-discharge problems associated with active iodine species being undesirably dissolved in the aqueous electrolyte and freed from the cathode; the necessity of ion exchange membranes to limit the problem of soluble iodine species; and instability and gas evolution problems. Accordingly, there exists a need for zinc-iodine secondary energy storage devices, methods, and electrolytes that can address the challenges.

SUMMARY

Disclosed are cathodes comprising electron-conductive high-surface-area materials, aqueous non-halide-containing electrolytes, secondary zinc-iodine energy storage devices using the same, and methods for assembling the same. The inventors have determined that embodiments of the disclosed high-surface-area materials and the aqueous non-halide-containing electrolyte solutions can contribute together to the confinement of the active iodine species in the cathode and to the minimization of shuttle effects and self-discharging. The high-surface-area cathode materials can provide stable and sustainable reaction sites for static iodine redox reactions. The non-halide-containing electrolyte salts can facilitate preferential adsorption of the iodine species to the cathode material rather than dissolution in the aqueous electrolyte solution, thereby contributing to the confinement of the active iodine species. Accordingly, the problems of shuttle effects, of self-discharge, of zinc dendrite formation, of gas evolution (e.g., (e.g., chlorine, oxygen, and hydrogen), and/or cycle instability in aqueous zinc-iodine rechargeable batteries are addressed by embodiments of the present invention, resulting in significantly improved performance, particularly with regard to long-term stability.

In some embodiments, a method of assembling a zinc-iodine secondary energy storage device comprises the steps of loading $I_2$ on an electron conductive, high-surface-area material, wherein the electron conductive, high-surface-area material having $I_2$ is located on a cathode side of the device and is counter to an anode side comprising a zinc-containing electrode. In certain embodiments, the loading of the $I_2$ occurs prior to initial charging. In other words, the device is assembled in a charged state. An aqueous electrolyte solution having no halides and having a non-halide-containing electrolyte salt dissolved therein is arranged between the anode and cathode sides. In certain embodiments, the aqueous electrolyte solution having no halides and having a non-halide-containing electrolyte salt comprises a solution having $ZnSO_4$ dissolved therein at a concentration greater than or equal to 0.5M. In certain embodiments, the aqueous electrolyte solution having no halides and having a non-halide-containing electrolyte salt comprises a solution having $Zn(CH_3COO)_2$ dissolved therein at a concentration greater than or equal to 0.1M.

In some embodiments, a secondary energy storage device comprises an anode comprising zinc and a cathode comprising an electron conductive, high-surface-area material. An active iodine species is adsorbed to the electron-conductive, high-surface-area material when the device is in a non-discharged state. The device further comprises an aqueous electrolyte solution having substantially no halides when the device is in a charged state. In certain embodiments, the electron conductive, high-surface-area material comprises graphene. In certain embodiments, the electron conductive, high-surface-area material comprises a conductive polymer material, a conductive Metal-organic framework (MOF)-based material, or a combination thereof. In certain embodiments, the electron conductive, high-surface-area material comprises activated carbon. In certain embodiments, the electron conductive, high-surface-area material comprises a porous material having pores with average pore diameters less than or equal to 50 nm, less than or equal to 40 nm, less than or equal to 25 nm, less than or equal to 10 nm, less than or equal to 5 nm, or less than or equal to 2 nm. In certain embodiments, no ion selective membrane separates the anode and the cathode. In certain embodiments, the zinc comprises zinc metal. In certain embodiments, the zinc comprises zinc ions and the anode further comprises an intercalation material into which zinc ions are intercalated and deintercalated. In certain embodiments, the intercalation material comprises $Zn_xMo_6S_8$. In certain embodiments, the aqueous electrolyte solution comprises a non-halide-containing, electrolyte salt dissolved therein. In certain embodiments, the non-halide-containing, electrolyte salt comprises $MSO_4$, wherein M is a metal. In certain embodiments, the non-halide-containing, electrolyte salt comprises $M(NO_3)_2$, $M(CF_3SO_3)_2$, or $M(CH_3COO)_2$, wherein M is a metal. In certain embodiments, M is Zn, K, or Na or other alkaline metals. In certain embodiments, the non-halide-containing, electrolyte salt comprises $ZnSO_4$. In certain embodiments, the $ZnSO_4$ has a concentration in the aqueous electrolyte solution greater than or equal to 0.5M. In certain embodiments, the $ZnSO_4$ has a concentration in the aqueous electrolyte solution greater than or equal to 1M, greater than or equal to 1.5M, greater than or equal to 2M, or greater than or equal to 3M. In certain embodiments, an interaction energy difference ($\Delta E$) between adsorption to the high-surface-area material and solvation in the aqueous electrolyte solution is less than zero for each of $I_2$ and $Zn(I_3)_2$ such that the $I_2$ and $Zn(I_3)_2$ are preferentially adsorbed to the high-surface-area material. Certain embodiments have a capacity retention greater than or equal to 90% after at least 3000 cycles at a rate of 2 C.

In some embodiments, a secondary energy storage device comprises an anode comprising zinc and a cathode comprising a mesoporous or a microporous, activated carbon material. Active iodine species are adsorbed to the mesoporous or microporous activated carbon material when the device is in a non-discharged state. The device further comprises an aqueous electrolyte solution having substantially no halides when the device is in a charged state and having $ZnSO_4$ dissolved therein at a concentration greater than or equal to 0.5M. No ion selective membrane separates the anode and cathode. An interaction energy difference (ΔE) between adsorption to the activated carbon material and solvation in the aqueous electrolyte solution is less than or equal to zero for each of $I_2$ and $Zn(I_3)_2$ such that the $I_2$ and $Zn(I_3)_2$ are preferentially adsorbed to the activated carbon material.

The purpose of the foregoing summary and the latter abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. Neither the summary nor the abstract is intended to define the invention of the application, which is measured by the claims, nor is it intended to be limiting as to the scope of the claims in any way.

BRIEF DESCRIPTION OF THE DRAWINGS

FIGS. 3A and 3B show performance results related to non-halide-containing electrolyte salts.

FIGS. 4A-4D show electrochemical performance data from embodiments of $Zn-I_2$ batteries in an aqueous electrolyte solution having 1 M $ZnSO_4$. FIG. 4D shows cycling of a $54I_2$/ACF electrode with an E/I ratio of 3 $ml_E g_I^{-1}$ at 1 C. Note that the specific capacity of iodine is calculated by subtracting the capacity of the ACF substrate itself from the overall capacity of the composite $I_2$/ACF at corresponding current densities, and the capacitance of the ACF substrate is considered to be linear in its surface area.

FIGS. 6A and 6B are graphs showing self-discharge behavior of embodiments of a zinc-iodine battery.

FIGS. 8A-8C show SEM characterizations of $40I_2$/ACF electrodes. FIG. 8A is before cycling. FIGS. 8B and 8C show discharge and charge states, respectively, after 100 cycles at 1 C. The scale bar represents 10 μm. The insets in FIGS. 8A and 8B show energy dispersive spectra. The discharged $40I_2$/ACF electrode was tested for SEM as obtained from cells without rinsing; the charged $40I_2$/ACF electrode was washed with deionized water and air dried before SEM imaging.

DETAILED DESCRIPTION

According to embodiments described herein, ultra-stable cycling is achieved with minimal capacity fading in a secondary energy storage device based on the conversion chemistry $Zn+I_2 \leftrightarrow ZnI_2$. Embodiments disclosed herein can take advantage of the excellent reaction kinetics of iodine species. In certain embodiments, the $I^-/I_2$ redox couples is extensively used during charge/discharge process (211 mAh $g^{-1}$ in theory). The effective confinement of active iodine species the electron-conductive, high-surface-area material in combination with the non-halide-containing electrolyte solution, prominently suppresses the shuttle effect of soluble iodine species and self-discharge of zinc-iodine batteries. Some embodiments can deliver an ultra-stable cyclic life over 3000 cycles with nearly 100% coulombic efficiency.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, concentrations, mass loadings, electrochemical measurements and properties, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Figure 1:
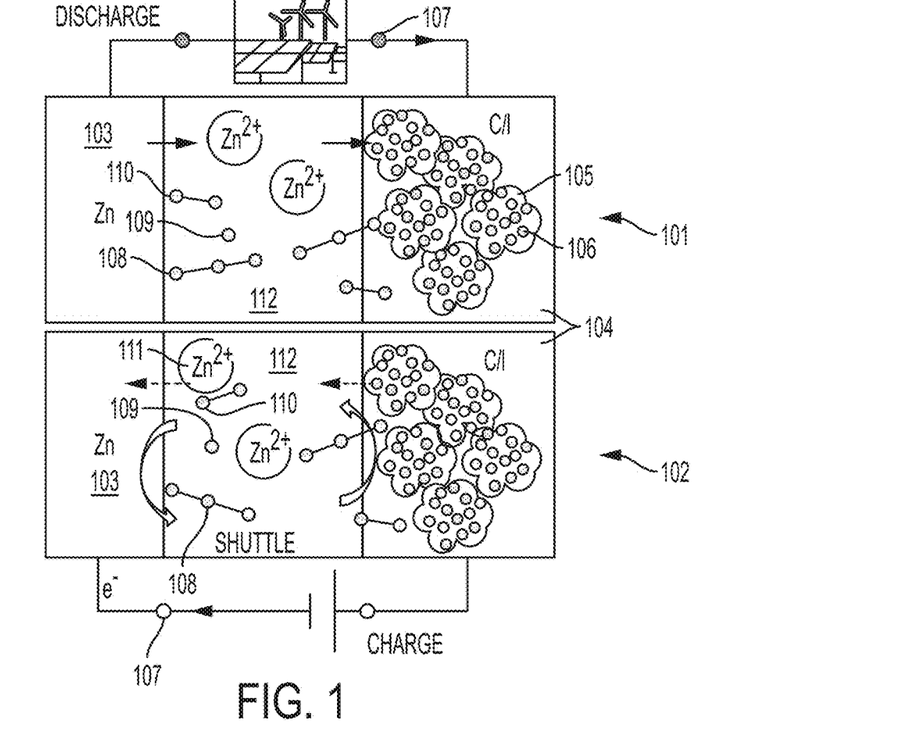
FIG. 1 is a schematic of an embodiment of a zinc-iodine secondary energy storage device.

Referring to FIG. 1, a secondary zinc-iodine energy storage device is shown during discharging 101 and charging 102 processes, including the flow of electrons 107. During discharge, zinc metal from the anode 103 is oxidized to yield $Zn^{2+}$ 111. At the cathode 104, iodine ($I_2$) is reduced to yield iodide ($I^-$) 106; zinc iodide ($ZnI_2$) is a discharge product. During charging, the reactions proceed in the opposite direction and $Zn^{2+}$ is reduced at the anode. Iodide and triiodide are oxidized to yield iodine. Triiodide ($I_3^-$) can be an intermediate and active iodine species. Dissolved iodine 110, triiodide ($I_3^-$) 108, and/or iodide 109 in the electrolyte solution 112 can result in self-discharge and shuttle effects and poor performance. The electron-conductive, high-surface-area material 105 of the cathode can serve as a host, to which the active iodine species (e.g., $I^-$ 106) adsorbs, thereby minimizing dissolution of active iodine species 108, 109, 110 into the electrolyte solution. In some embodiments, the devices, electrodes, and/or electrolyte solutions are arranged in a static (i.e., non-flow) configuration.

The inventors determined unexpectedly that even though the zinc triiodides (and to some extent, the other active iodine species) are soluble in the aqueous electrolyte solutions, the electrochemical reactions can be almost 100% reversible with an ultra-stable cyclic life, reaching 3000 cycles with little to no obvious self-discharge and with minimized shuttle effects. Adsorption and dissolution mechanisms of the active iodine species in the embodiments described herein can be manipulated such that confinement of active species within the cathode and the use of a stabilizing, non-halide-containing electrolyte contribute to stabilization and reversibility of the solid-liquid conversion reactions. In some embodiments, competition between the processes of adsorption of active iodine species onto the high-surface-area material of the cathode and solvation of the active iodine species in the electrolyte solution can be manipulated.

In some embodiments, zinc-iodine secondary energy storage devices can be assembled in a charged state. Iodine can be loaded onto the electron-conductive, high-surface-area material to compose the cathode. The anode can be arranged counter to the anode. The non-halide-containing, aqueous electrolyte solution can be arranged between the anode and cathode. The non-halide-containing electrolyte salt can comprise a salt of the cathodic metal, for example zinc. The cathodic metal salt is not a metal halide. Accordingly, the aqueous electrolyte solution has substantially no halides when the device is in the charged state. In some instances, the iodine achieves an equilibrium between adsorption to the high-surface-area material and dissolution in the electrolyte solution. Accordingly, the term substantially no halide can refer to the situation in which the only observable halide includes iodine species that are present in the electrolyte solution in an amount less than or equal to its equilibrium concentration at the given temperature. In other embodiments, the iodine species are present in a concentration less than or equal to the solubility limit of iodine in water. In still other embodiments, the iodine species are present in a concentration less than or equal to 0.002 M, or less than or equal to 0.001 M, or less than or equal to 0.0005 M. However, no halide-containing salt is deliberately added to the electrolyte solution. After a discharge and subsequent charge of the device assembled in such a manner, the active iodine species are substantially confined in the cathode and are not dissolved into the electrolyte solution. In some embodiments, the non-halide-containing electrolyte salt is considered a supporting electrolyte salt that does not comprise a cathode-side redox species.

In certain embodiments, zinc-iodine secondary energy storage devices can be assembled in a discharged state. An electron-conductive, high-surface-area material can be arranged on a cathode side with an anode comprising zinc arranged counter to the cathode. An electrolyte solution can be arranged between the anode and cathode sides. The electrolyte solution comprises dissolved zinc iodide and a non-halide-containing electrolyte salt. During initial charge, the active iodine species adsorb to the high-surface-area material of the cathode and are subsequently well-confined. After initial charge (i.e., in the charged state) there is substantially no halide in the electrolyte solution.

To further illustrate certain embodiments of the disclosed secondary energy storage devices, cathode materials, electrolytes, and methods of assembling the same, and to provide various comparative analyses and data, below are some examples with comparison test data.

Figure 2:
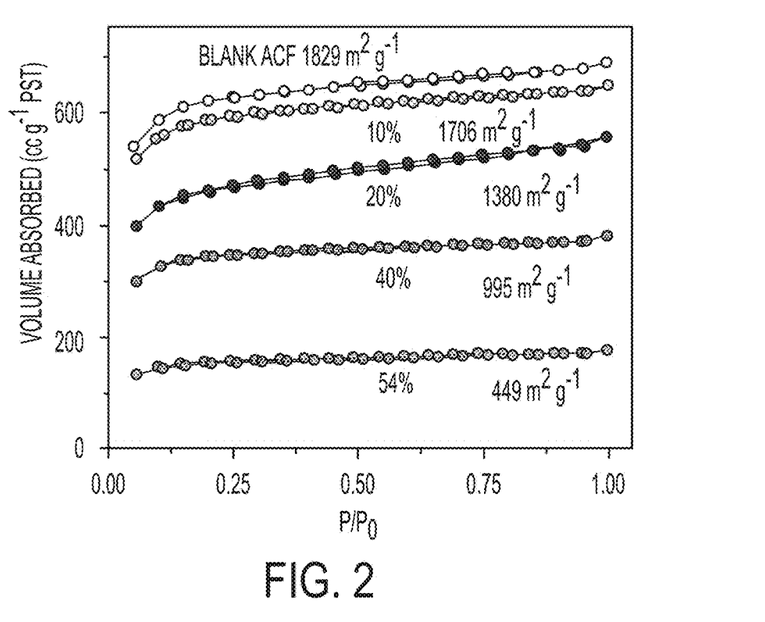
FIG. 2 is a graph showing BET surface areas calculated from nitrogen adsorption-desorption isotherms for ACF electrodes with different iodine loading. P and $P_0$ represent the equilibrium and the saturation pressures of the adsorbates, respectively, at the temperature of adsorption.

Iodine can be loaded in various amounts into the micropores of an active carbon fiber cloth (ACF), which in some embodiments serves as the conductive, porous material. Brunauer-Emmett-Teller (BET) surface area measurements show that the average pore size of ACF used in some examples described herein is less than 2 nm. In the examples, the highest amount of iodine loaded on the ACF was 54 wt %, which loading was accompanied by a decrease in specific surface area from 1829 to 449 $m^2$ $g^{-1}$ (FIG. 2). Additional loading values included 10 wt %, 20 wt %, and 40 wt %. The $I_2$/ACF materials were prepared using 22.2 mg, 50 mg, 133.3 and extra (1000 mg)mg $I_2$, which were added into 400 ml DI water, respectively with mild stirring at room temperature. 200 mg ACF was added into each of the above solutions to adsorb the $I_2$ until no more color change was observed. The obtained $I_2$/ACF composites, are denoted by their $I_2$ contents, i.e. $10I_2$/ACF, $20I_2$/ACF, $40I_2$/ACF, and $54I_2$/ACF (the highest practical loading). The composites were dried in an ambient temperature of approximately 60° C. overnight to remove residual water. The loading calibrated by the final mass of each $I_2$/ACF composite was 9.5 wt %, 19 wt %, 38 wt %, and 54 wt % respectively. Still other loading values and other ACF materials with different average pore sizes are encompassed by other embodiments of the present invention. For example, the ACF can be mesoporous having average pore diameters less than or equal to 50 nm.

Figure 3A:
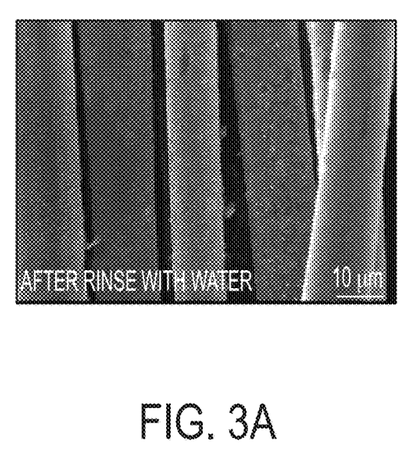
FIG. 3A shows an SEM image of $40I_2$/ACF electrode rinsed with DI water after 100 cycles at the discharged state.
Figure 3B:
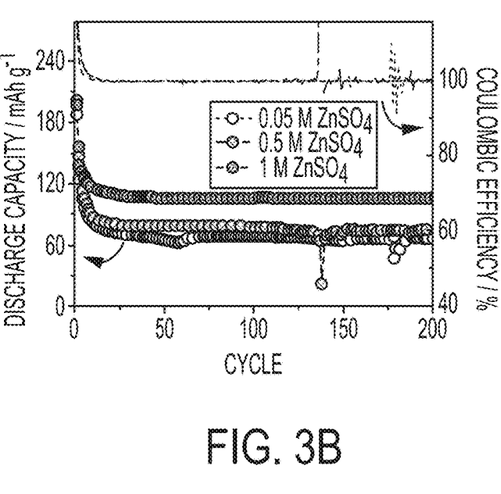
FIG. 3B is a graph showing the cycling performance of a $40I_2$/ACF electrode in 0.05 M, 0.5 M and 1M $ZnSO_4$ electrolytes.

Cyclic voltammetry (CV) scans of iodine-loaded ACF ($I_2$/ACF) electrodes in $ZnSO_4$ and $ZnAc_2$ electrolytes, respectively, exhibit a pair of broad redox peaks located at ~1.25 V vs. $Zn/Zn^{2+}$. The peaks can be ascribed to redox reactions of in the pores of the ACF. The zinc-iodine batteries used for electrochemical measurements and characterization were assembled with an $I_2$/ACF composite as cathode, Zn as anode, and glass fiber and/or celgard as separator. 1M $ZnAc_2$ and 1M $ZnSO_4$ aqueous solution were used as electrolyte respectively. The cells were operated in a voltage range of 1.8-2.6 V using LANHE battery tester ZnSO$_4$ was dissolved in an aqueous solution at various concentrations. In one embodiment, electrolyte solutions having a concentration of ZnSO$_4$ that is greater than or equal to 0.5 M exhibited an absence of ZnI$_2$ hydrolysis, which leads to formation of white precipitates (e.g. Zn(OH)$_2$). In certain embodiments, depending on the iodine loading and electrolyte usage, the concentration of ZnSO$_4$ can be lower than 0.5 M and still exhibit an absence of ZnI$_2$ hydrolysis. The concentration can be greater than or equal to 0.1M. Precipitates can coat the I$_2$/ACF electrode surface, leading to poor reaction kinetics and reduced iodine utilization (FIG. 3A-3B). This was confirmed by the increased capacity as the ZnSO$_4$ concentration was increased from 0.05 M to 1 M (FIG. 3B). In some embodiments, considering the suppression of ZnI$_2$ hydrolysis and the minimization of current cost of materials, the concentration of zinc sulfate dissolved in the aqueous electrolyte is approximately 1 M ZnSO$_4$. As cost of materials change and/or as device applications require, the concentration can increase or decrease.

Figure 4A:
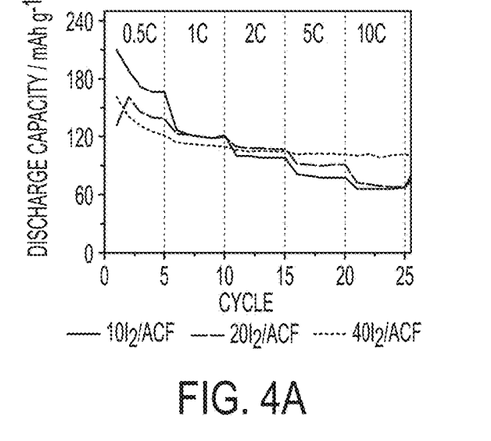
FIG. 4A is a graph of the rate capability of $I_2$/ACF electrodes with different iodine mass loadings including examples in which the E/I ratio is greater than 30 ml/g(iodine).
Figure 4B:
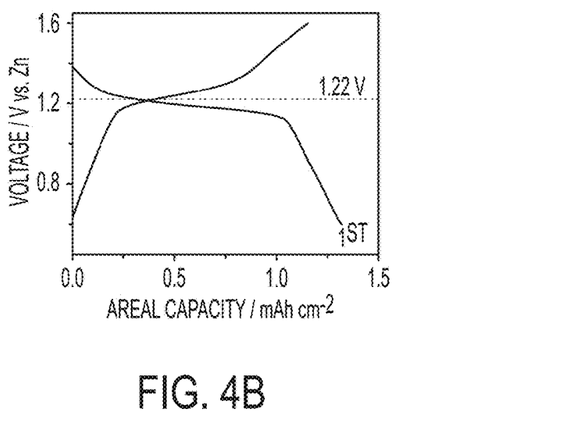
FIG. 4B is a graph including charge and discharge curves of the $40I_2$/ACF composite electrode in the first cycle at 0.5 C (extra electrolyte).
Figure 5:
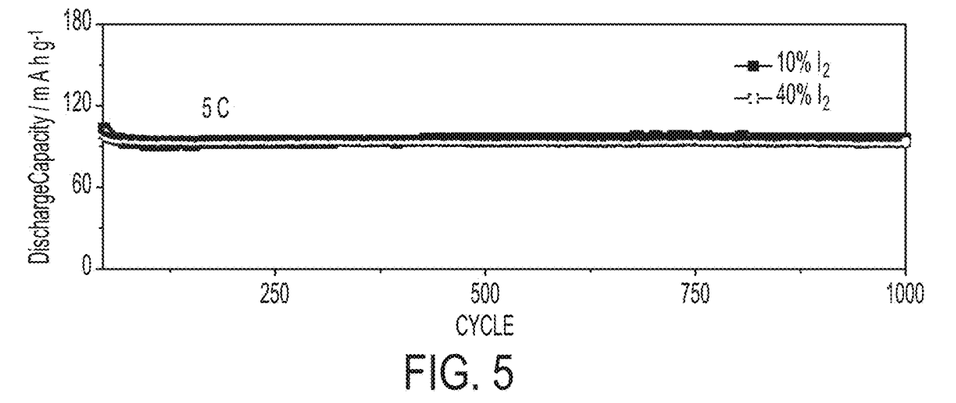
FIG. 5 is a graph showing the long-term cycling performance of $I_2$/ACF (⅜") electrodes with different iodine loadings at 5 C in 1M $ZnSO_4$ aqueous electrolyte.

FIG. 4A shows a comparison of rate capability of I$_2$/ACF electrodes with different I$_2$ mass loadings. The ACF electrode having approximately 10 wt % I$_2$ loaded in the ACF (10I$_2$/ACF), based on the total I$_2$/ACF electrode weight, showed an initial discharge capacity of 209 mAh g$_I^{-1}$ at 0.5 C, which is very close to the theoretical capacity of 211 mAh g$^{-1}$. For the I$_2$ loading of 40 wt % (40I$_2$/ACF), the composite electrode retained a reversible capacity of 160 mAh g$_I^{-1}$ at 0.5 C. FIG. 4B shows the overall charge/discharge curves of the 40I$_2$/ACF composite electrode in the first cycle at 0.5 C. The average Zn storage voltage is 1.22 V, which is consistent with the CV results. In addition, the capacity of the iodine reaction was stable for over 1000 cycles at 5 C. The excellent stability and reversibility of the iodine redox reactions in 10I$_2$/ACF and in 40I$_2$/ACF electrodes is shown in FIG. 5.

Figure 4C:
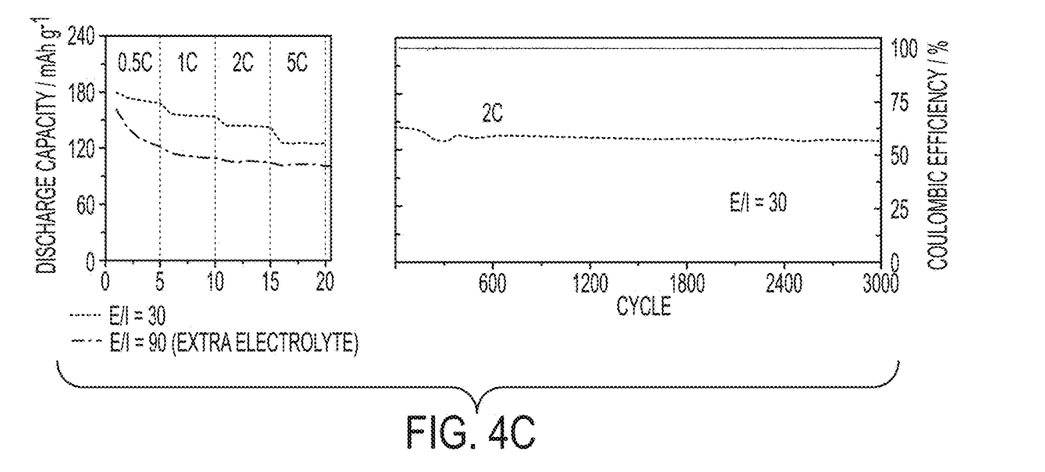
FIG. 4C shows rate and long-term cycling of $40I_2$/ACF electrode; the E/I ratio for long-term experiment was 30 $ml_E g_I^{-1}$ at 2 C.

In some instances, rapid capacity decay of more than one-third occurs in the initial cycles before the capacity stabilizes for the iodine-based electrodes described herein (FIG. 4A and FIG. 3B). This is possibly due to the release of iodine from the ACF electrode into the electrolyte during the initial cycles, whereas the equilibrium of iodine species adsorption and dissolution in the electrolyte can subsequently be achieved. In such instances, the aqueous electrolyte solution with substantially no halides can comprise an amount of dissolved iodine species that is less than or equal to an equilibrium amount at the operating conditions of the device (e.g., cell temperature, electrolyte composition, charge/discharge state, operating voltage, etc.). The electrolyte solution having substantially no halides can refer to an absence of halide-containing redox electrolyte or halide-containing supporting electrolyte. In situations where an equilibrium amount (or less) of iodine dissolves from the cathode, embodiments described herein can manipulate the equilibrium. In certain embodiments, the volume of electrolytes and/or the loading of iodine in the ACF can be adjusted. For example, the stabilized capacity can be affected by the ratio of the electrolyte volume to the iodine mass (E/I). A lower E/I ratio should favor fast equilibrium and the reduction of the total loss of iodine species from I$_2$/ACF electrodes during cycling. FIG. 4C shows the comparison of the 40I$_2$/ACF electrode with E/I ratios of 30 ml$_E$ g$_I^{-1}$ and 90 ml$_E$ g$_I^{-1}$. At the lower E/I ratio (30 ml$_E$ g$_I^{-1}$), the 40I$_2$/ACF electrode shows reversible capacities of 174, 155, 143, and 124 mAh g$_I^{-1}$ at 0.5, 1, 2, and 5 C respectively, leading to 21-38% increases in capacity compared with capacities at higher E/I ratio of 90 ml$_E$ g$_I^{-1}$. In particular, with the lower E/I ratio of 30 ml$_E$ g$_I^{-1}$, the 40I$_2$/ACF electrode exhibits ultra-stable cycling over 3000 cycles at 2 C with capacity retention of 90% (after the rate test) and a high coulombic efficiency of ~100%.

Figure 4D:
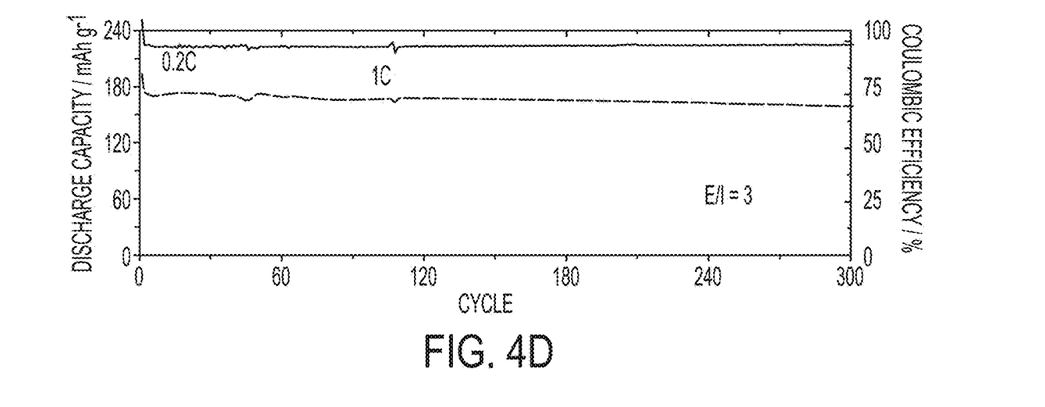

Increasing the iodine content in the I$_2$/ACF electrode and decreasing the E/I ratio can improve initial capacity decay. In one example, as shown in FIG. 4D, the iodine loading was increased to 54 wt % and the E/I ratio was decreased by one magnitude (i.e., 3 ml$_E$ g$_I^{-1}$). The 54I$_2$/ACF electrode delivered an initial capacity of 193.38 mAh eat 0.2 C and 174.4 mAh g$^{-1}$ at 1 C. The rapid capacity decay during the initial cycles was significantly reduced, resulting in very high iodine utilization (~50% increase at 1 C compared to the cell with an E/I ratio of 90 ml$_E$ g$_I^{-1}$).

Figure 6A:
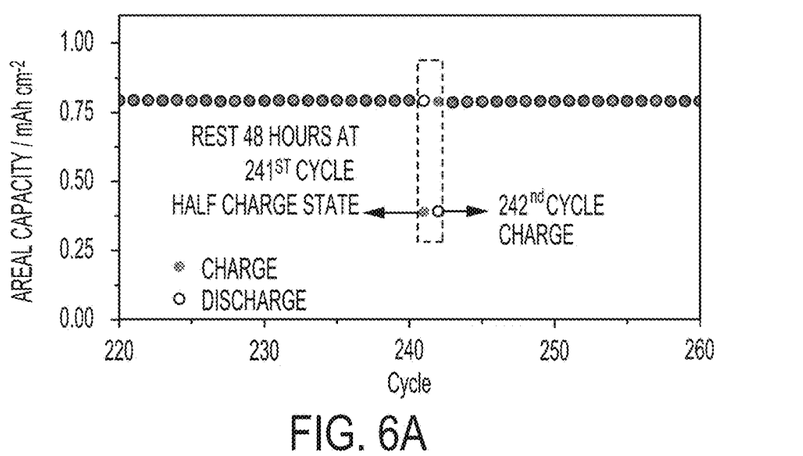
FIG. 6A shows cycling of a $Zn-I_2$/ACF battery, which was rested for 48 hours at half charge state on the 241st cycle.
Figure 6B:
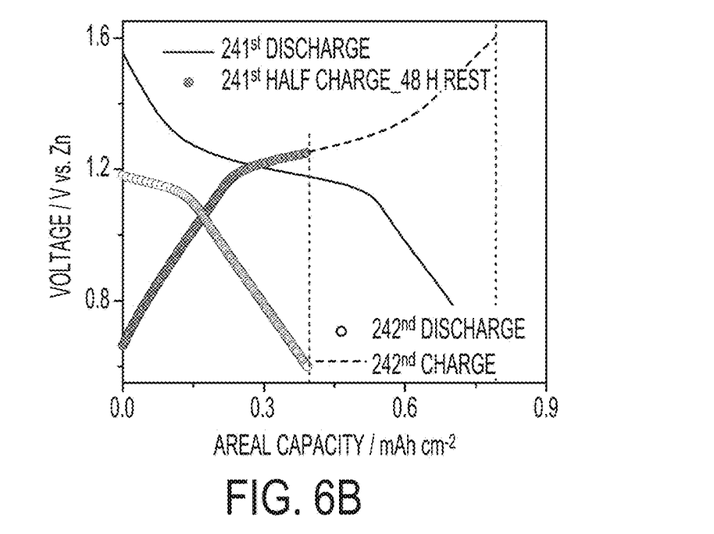
FIG. 6B shows charge and discharge curves of the $Zn-I_2$ battery before and after the 48-hour rest at half charge state.

The self-discharge behavior at a rate of 1 C of one embodiment is exhibited through the data in FIGS. 6A and 6B. The Zn—I$_2$ battery having a cathode composition comprising 40I$_2$/ACF (i.e., E/I=80 ml/g) was rested for 48 hours in a half-charge capacity of 0.389 mAh cm$^{-2}$ during the 241$^{st}$ cycle (FIG. 6A). In the half-charge state, most of the iodine species exist in the form of triiodide and iodide ions.) FIG. 6B shows the charge/discharge curves of the Zn—I$_2$ battery before and after rest. After resting for 48 hours, the Zn—I$_2$ battery shows negligible drop (10 mV) in open circuit voltage (OCV) and retains almost the same capacity of 0.391 mAh cm$^{-2}$ in the following 242$^{nd}$ discharge process. Almost no cyclic deterioration occurs in the subsequent cycles. The soluble species of iodine (including, but not limited to, triiodide and iodide), if present in the aqueous electrolyte would lead to significant self-discharge because of their dissolution. The absence of observable self-discharge over the 48-hour rest period demonstrates the effectiveness of embodiments described herein. The adsorption of active iodine species to the cathode material, the non-halide-containing electrolyte, and/or the E/I ratio contribute to the performance exhibited by embodiments described herein. For example, the active iodine species are prone to stay adsorbed to the cathode material rather than dissolving in the electrolyte solution, apparently preventing self-discharge capacity loss. No expensive ion-exchange membrane was necessary in order to mitigate the self-discharge effect usually caused by the crossover of soluble iodine species.

Mixed zinc salt solutions comprising Zn(I$_3$)$_2$, ZnI$_2$, and ZnSO$_4$ examined before and after adsorption in ACF demonstrate preferential adsorption of active iodine species (e.g., triiodide and iodide). UV-vis spectra were performed for the mixed solutions before and after ACF adsorption (spectra not shown). The intensity of the peak at the 352 nm wavelength corresponding to triiodide ions is significantly decreased after AFC adsorption. Inductively coupled plasma mass spectrometry (ICP-MS) results (no figure shown) corroborate the UV-vis spectra in that the concentration of Zn$^{2+}$ decreases by ~2 mM after adsorption due to confinement of the Zn(I$_3$)$_2$ species. In contrast, the sulfate concentration remains constant. This suggests preferential adsorption of Zn(I$_3$)$_2$ in the ACF relative to dissolution in the non-halide-containing electrolyte solution, which can inhibit the diffusion of I$_3$ out from the electrode. The relationship to embodiments disclosed herein is suppressed self-discharge of Zn—I$_2$ energy storage devices and high coulombic efficiency with greatly reduced shuttle effects.

Figure 8A:
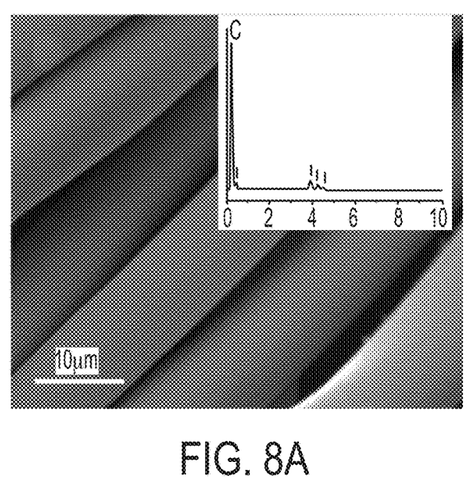
Figure 8B:
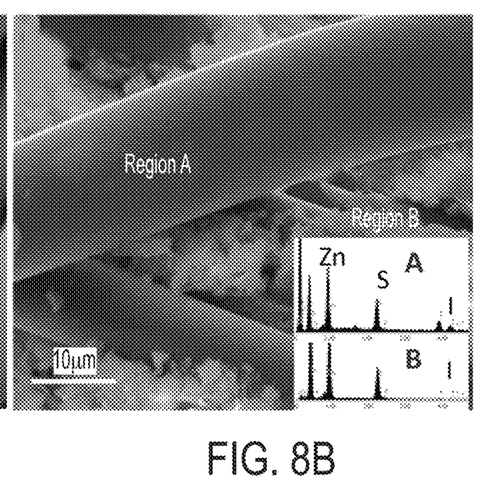
Figure 8C:
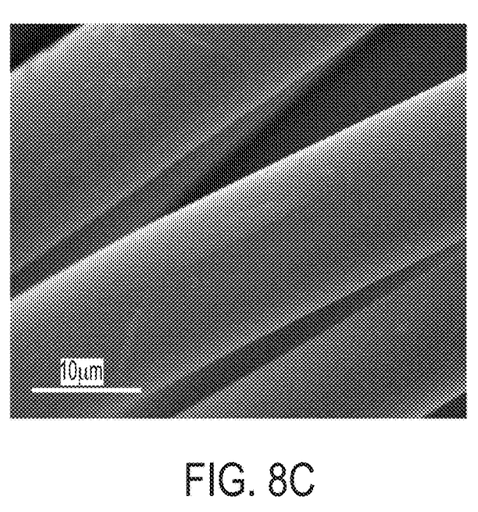

Referring to FIGS. 8A-8C, the morphology of I$_2$/ACF electrodes included in embodiments described herein was investigated during charge and discharge after 100 cycles. FIG. 8A shows the scanning electron microscope (SEM) image of an ACF after iodine loading. The energy dispersive spectra (EDS) in the inset indicates the presence of carbon and iodine as expected. The relatively clean surface indicates that all the iodine is well encapsulated into the micropores. In the discharged state after 100 cycles, the morphology of the ACF electrode shows no observable changes on the surfaces (Region A in FIG. 8B). The mossy background of Region B in FIG. 8B is $ZnSO_4$ salt originating from electrolytes. Referring to the EDS of Region B in the inset of FIG. 8B, indicates the presence of Zn and S, but not I. The discharged ACF electrode was not rinsed in order to avoid the hydrolysis of $ZnI_2$ to form insoluble precipitations during rinsing. EDS (see inset of FIG. 8B) of the ACF electrode confirms the existence of Zn and I in the ACF pores after discharge (Region A, inset of FIG. 8B), indicating that the microporous ACF is capable of retaining the discharge product of $ZnI_2$. After charging, wherein $ZnI_2$ is converted back to $I_2$, the surface of $I_2$/ACF electrode exhibits no observable change (FIG. 8C). In contrast with non-aqueous system, the ACF electrode with the microporous structure can be an excellent confining host for iodine species in aqueous systems and can provide stable and sustainable reaction sites for the iodine redox reaction during charge and discharge. The stable confinement of iodine species, particularly for iodine and triiodide, in porous and/or high-surface-area materials is believed to be the one of the main reasons for the ultra-stable cycling performance, high coulombic efficiency, and negligible self-discharge behavior in aqueous $Zn—I_2$ batteries.

In general, the adsorption of iodine species onto the surface of the conductive porous material or the conductive, high-surface-area material competes with the dissolution of the iodine species the aqueous non-halide-containing electrolyte solution. DFT simulations were performed to examine at the molecular scale these competing processes between the surface of an ACF material and an aqueous solution. In a DFT simulation, the interaction energy difference ($\Delta E$) of each iodine species in the above two processes (adsorption and solvation) was calculated. Iodine species (i.e., $I_2$ and $Zn(I_3)_2$) show negative $\Delta E$ values of $-7.2$ kJ $mol^{-1}$ and $-164.4$ kJ $mol^{-1}$ in water, respectively, indicating they are preferentially adsorbed onto the ACF surface rather than being dissolved in water solvents due to their stronger interaction with the carbon surface. This is consistent with the absence of observable self-discharge described elsewhere herein (e.g., FIG. 6B). On the contrary, $I_2$ and $Zn(I_3)_2$ exhibit significantly positive $\Delta E$ values of 178.6 kJ $mol^{-1}$ and 151.5 kJ $mol^{-1}$ in an organic solvent such as propylene carbonate (PC), suggesting that they are more likely to be dissolved in solvent rather than to interact with the carbon surface due to the much stronger solvating interaction in the PC solvent. This is evidenced by the much lower available discharge capacity and the endless charge phenomenon, which can be observed when using organic solvents due to shuttle effects of $I_2$ and/or $I_3^-$ in organic electrolytes. An $I_2$/ACF electrode soaked in 2 mL PC compared to one soaked in water demonstrate that encapsulated $I_2$ in ACF was dissolved into the PC in seconds but remained stable in water (no figure shown). Accordingly, embodiments described herein encompass the manipulation of the competition between iodine species adsorption on the cathode material surface and iodine species solvation in aqueous electrolyte solutions. In certain embodiments, the interaction energy difference ($\Delta E$) of each iodine species in the two processes (adsorption and solvation) is controlled by appropriate combinations of cathode materials and electrolyte compositions such that active iodine species are preferentially adsorbed to the cathode materials rather than dissolved into the aqueous electrolyte solution.

In one embodiment of a $Zn—I_2$ secondary energy storage device, the average diameter of the pores in the conductive porous cathode material is less than or equal to 2 nm. The Coulombic efficiency was 99.2% at 1 C. In another embodiment, the average diameter of the pores in the conductive porous cathode material is less than or equal to 5 nm. The Coulombic efficiency was 96% at 1 C. The areal iodine mass loading was the same in both devices and was based on the total real surface area of the carbon host. The electrolyte was 1 M $ZnSO_4$ in $H_2O$, and the E/I ratio was 30 $ml_E$ $g_I^{-1}$. The current rate was 1 C. The carbons used for the pore size investigations were ACF and ordered mesoporous carbon (having average pore diameter less than or equal to 4.3 nm). The iodine loading per surface area for both carbon hosts was 0.3 mg $m^{-2}$.

According to some embodiments, the surface chemistry of the conductive, porous cathode material is functionalized to influence the adsorption of iodine species. For example, the amount of oxygen-containing functional groups on the surfaces of the cathode material can be increased. DFT calculations yielded a more negative $\Delta E$ with oxygen-containing functional groups on carbon surfaces for the intermediate soluble zinc triiodides in water. It appears that bonding between zinc ions and functional groups is enhanced. The oxygen-containing functional groups can strengthen the adsorption of iodine species on microporous ACFs. NMR measurements were in good agreement with DFT calculation results and indicated a significant reduction of oxygen-containing functional groups after soaking an ACF cathode material in $I_2$ and $ZnI_6$-containing water solutions because of the adsorption of iodine species to surfaces of the ACF.

Figure 7A:
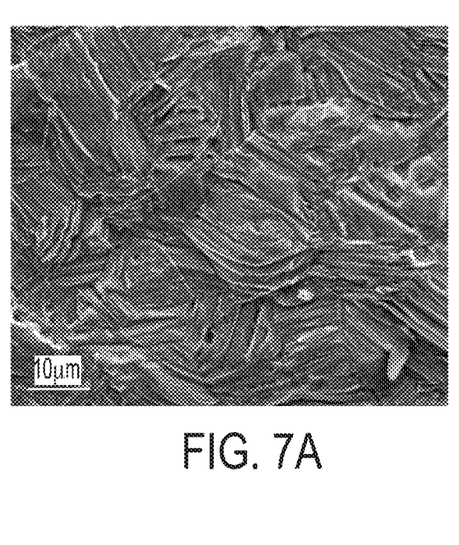
FIGS. 7A and 7B show SEM images of Zn anodes after 100 cycles at discharge and charge states, respectively, at 1 C. The scale bar represents 10 μm.
Figure 7B:
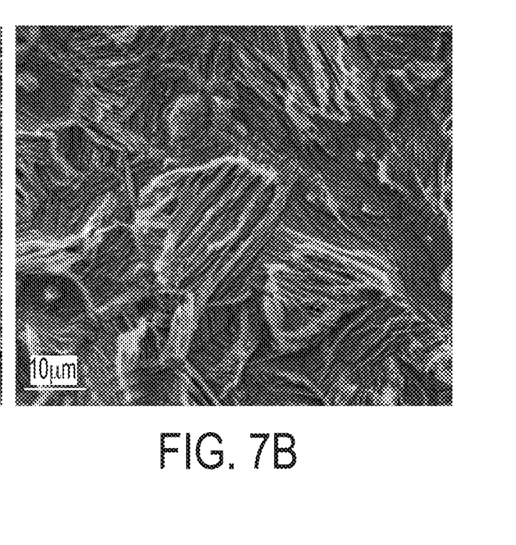
Figure 9:
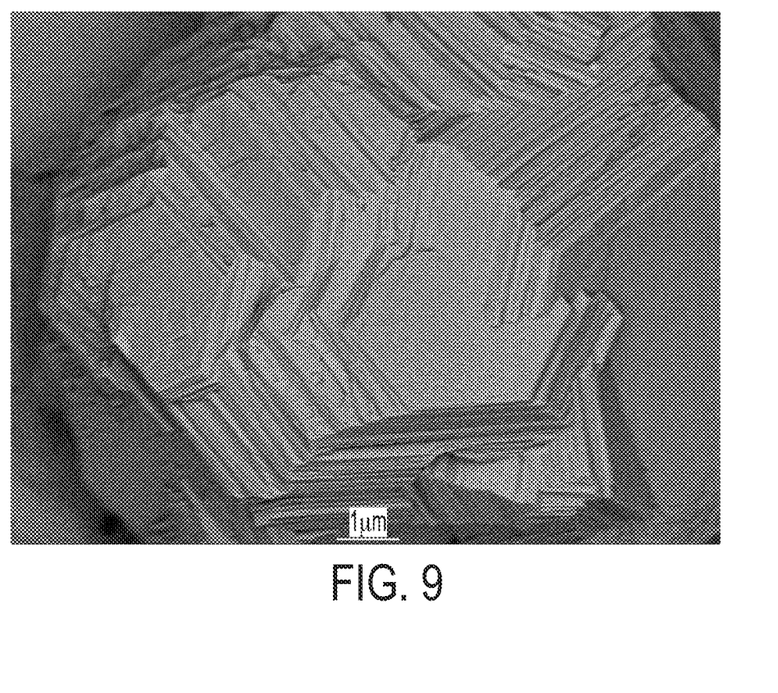
FIG. 9 is an SEM image of Zn metal after electrodeposition at a constant current density of 10 mA $cm^{-2}$.

The morphologies of zinc anodes were examined after 100 cycles (at a current density of 0.5 mA $cm^{-2}$) (FIGS. 7A and 7B). The zinc particles were closely packed on the surface of the anode, and no dendrite growth was observed during cycling. A series of ex situ experiments were performed with Zn plating in aqueous solutions with 1 M $ZnSO_4$ at different constant current densities from 0.5 to 10 mA $cm^{-2}$ using a three-electrode electrodeposition method. Similar morphologies and no zinc dendrites were observed even at a high current density of 10 mA $cm^{-2}$ (see FIG. 9). The stable stripping/plating process of Zn in the aqueous $ZnSO_4$ solution helps explain the stable good performance of embodiments described herein.

Figure 10:
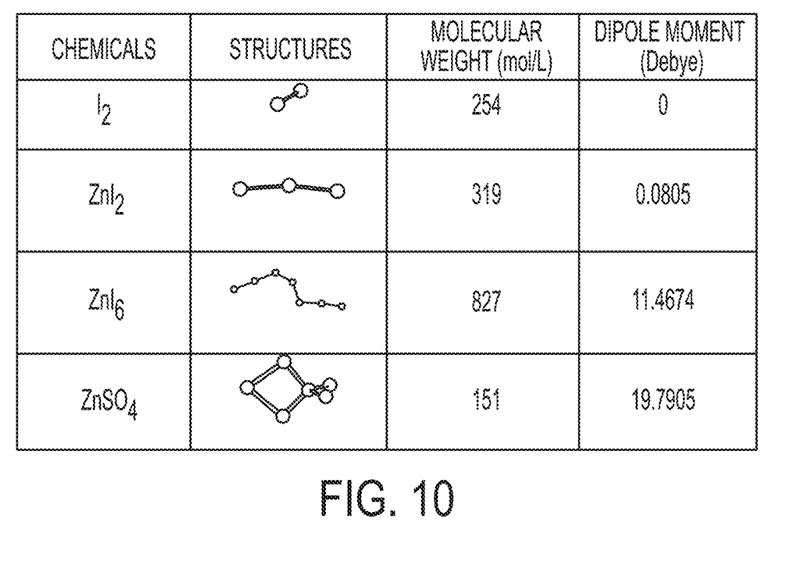
FIG. 10 is a table containing dipole moments of molecules representing the polarity of iodine species and zinc sulfate molecules calculated using DFT methods.

The adsorption phenomenon involving active carbon is similar to the London dispersion force between carbon surfaces and adsorbed molecules, depending on weight, size and polarity of the molecule, wherein activated carbon is prone to adsorb large non-polar molecules. The dipole moments of molecules representing polarity of molecules are calculated using DFT methods. The properties of iodine species and $ZnSO_4$ molecules are shown in the table of FIG. 10. $I_2$ (i.e., iodine), $ZnI_6$ (i.e., triiodide), and $ZnI_2$ (i.e., iodide) all exhibit larger molecular weights and smaller dipole moments than $ZnSO_4$ molecule, suggesting higher London forces of between the ACF substrate and the iodine species. Accordingly, preferential adsorption to ACF of iodine species is observed instead of $ZnSO_4$ during the charge/discharge process. This is consistent with performance and characteristics exhibited by embodiments and examples described herein. In addition, the ACF host has a large number of edge carbon atoms due to the high surface area. As a result, many types of functional groups, e.g. hydroxyl/epoxy (C—O), carbonyl (C=O) and ester (O—C=O) groups can be chemically bonded to the carbon surfaces. These functional groups can further enhance the adsorbability of ACF by iodine species leading to the excellent stability of $I_2$/ACF electrodes during long-term cycling and negligible self-discharge.

Figure 11:
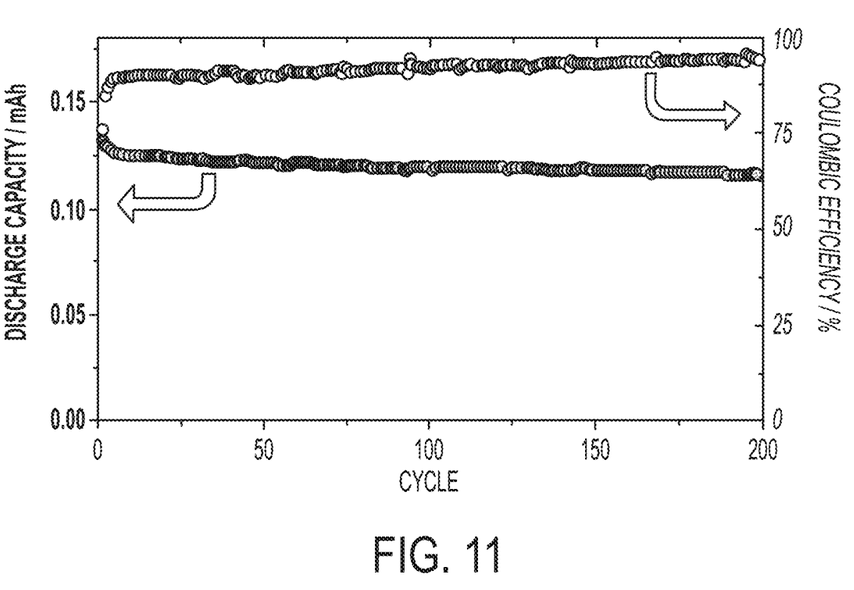
FIG. 11 is a graph showing the long-term cycling performance of an embodiment having $I_2$-graphene as a conductive, high-surface-area cathode material.

The high-surface-area material is not limited to porous materials. For example, the material can comprise graphene. The graphene can be, but is not necessarily, porous, mesoporous, or microporous. The surface area of the graphene can be greater than 500 m$^2$/g. It can be greater than 600 m$^2$/g. The surface area of microporous graphene can be greater than or equal to 1200 m$^2$/g. Referring to the graph of long-term cycling performance in FIG. 11, graphene was used as the host material in the cathode. The surface area of the graphene was 661 m$^2$/g. The iodine loading on the graphene was 18 wt % and the aqueous electrolyte solution comprised 1M $ZnSO_4$. The E/I ratio was 3. After 200 cycles the Coulombic efficiency was still greater than 90% and the capacity retention was 87.2%. After the 290$^{th}$ cycle, the Coulombic efficiency increased slightly and was 97.6% while the capacity retention was 84.9%.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A secondary energy storage device comprising:
   an anode comprising zinc;
   a cathode comprising an electron conductive, porous-material having pore diameters less than 50 nanometers and active iodine species adsorbed to the material when the device is in a non-discharged state; and
   an aqueous electrolyte solution having substantially no halides when the device is in a charged state, wherein no ion selective membrane separates the anode and the cathode.

2. The secondary energy storage device of claim 1, wherein the electron conductive, porous comprises graphene.

3. The secondary energy storage device of claim 1, wherein the electron conductive, porous material comprises a conductive polymer material, a conductive Metal-organic framework (MOF)-based material, or a combination thereof.

4. The secondary energy storage device of claim 1, wherein the electron conductive, porous material comprises activated carbon.

5. The secondary energy storage device of claim 1, wherein the electron conductive porous material has pores less than or equal to 2 nm.

6. The secondary energy storage device of claim 1, wherein the zinc comprises zinc metal.

7. The secondary energy storage device of claim 1, wherein the zinc comprises zinc ions and the anode further comprises an intercalation material into which zinc ions are intercalated and deintercalated.

8. The secondary energy storage device of claim 7, wherein the intercalation material comprises $Mo_6S_8$.

9. The secondary energy storage device of claim 1, wherein the aqueous electrolyte solution comprises a non-halide-containing, electrolyte salt dissolved therein.

10. The secondary energy storage device of claim 9, wherein the non-halide-containing, electrolyte salt comprises $MSO_4$, wherein M is a metal.

11. The secondary energy storage device of claim 9, wherein the non-halide-containing, electrolyte salt comprises $M(NO_3)_2$, $M(CF_3SO_3)_2$, or $M(CH_3COO)_2$, wherein M is a metal.

12. The secondary energy storage device of claim 11, wherein M is Zn, K, or Na or other alkaline metals.

13. The secondary energy storage device of claim 9, wherein the non-halide-containing, electrolyte salt comprises $ZnSO_4$.

14. The secondary energy storage device of claim 13, wherein the $ZnSO_4$ has a concentration in the aqueous electrolyte solution greater than or equal to 0.5M.

15. The secondary energy storage device of claim 13, wherein the $ZnSO_4$ has a concentration in the aqueous electrolyte solution greater than or equal to 1M, greater than or equal to 1.5M, greater than or equal to 2M, or greater than or equal to 3M.

16. The secondary energy storage device of claim 1, having a capacity retention greater than or equal to 90% after at least 3000 cycles at a rate of 2 C.

* * * * *